United States Patent
Durand

(10) Patent No.: US 7,522,994 B2
(45) Date of Patent: Apr. 21, 2009

(54) EXHAUST CONTROL SYSTEM IMPLEMENTING FUEL QUALITY DETECTION

(75) Inventor: James C. Durand, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 532 days.

(21) Appl. No.: 11/311,222

(22) Filed: Dec. 20, 2005

(65) Prior Publication Data

US 2007/0143007 A1  Jun. 21, 2007

(51) Int. Cl.
*G02D 41/02* (2006.01)
*G06F 19/00* (2006.01)

(52) U.S. Cl. ............... 701/207; 701/108; 123/41.12

(58) Field of Classification Search ........... 701/207, 701/213, 101, 102, 36, 126, 108; 60/277, 60/324, 311; 123/41.12, 41.44
See application file for complete search history.

(56) References Cited

U.S. PATENT DOCUMENTS

| | | | |
|---|---|---|---|
| 3,788,284 A | | 1/1974 | Gardner |
| 5,583,765 A | * | 12/1996 | Kleehammer ............... 701/1 |
| 5,844,505 A | | 12/1998 | Van Ryzin |
| 5,983,156 A | * | 11/1999 | Andrews .................. 701/115 |
| 6,016,795 A | * | 1/2000 | Ohki ........................ 123/681 |
| 6,092,014 A | | 7/2000 | Okada |
| 6,112,151 A | * | 8/2000 | Kruse ....................... 701/115 |
| 6,151,549 A | * | 11/2000 | Andrews et al. ........... 701/115 |
| 6,182,000 B1 | | 1/2001 | Ohta et al. |
| 6,199,001 B1 | | 3/2001 | Ohta et al. |
| 6,370,472 B1 | * | 4/2002 | Fosseen ..................... 701/102 |
| 7,062,371 B2 | * | 6/2006 | Gault et al. ................ 701/109 |
| 2003/0135323 A1 | | 7/2003 | Votsmeier et al. |
| 2003/0182026 A1 | | 9/2003 | Awada et al. |
| 2004/0145496 A1 | | 7/2004 | Ellis |
| 2005/0165518 A1 | | 7/2005 | Reynolds et al. |

FOREIGN PATENT DOCUMENTS

| | | |
|---|---|---|
| DE | 199 22 748 A1 | 11/2000 |
| DE | 101 43 509 A1 | 4/2003 |
| EP | 1 515 016 | 3/2005 |
| WO | WO 2004/076830 | 9/2004 |
| WO | WO 2005/024210 A | 3/2005 |

OTHER PUBLICATIONS

PCT International Search Report, PCT/US2006/040826; International Filing Date: Oct. 20, 2006; Priority Date: Dec. 20, 2005; Applicant: Caterpillar Inc.

* cited by examiner

*Primary Examiner*—Tan Q Nguyen
(74) *Attorney, Agent, or Firm*—Finnegan, Henderson, Farabow, Garrett & Dunner

(57) ABSTRACT

An exhaust control system for a power source is disclosed. The exhaust control system includes a navigation tool and a processor. The navigation tool is configured to detect a geographical location of a power source. The processor is configured to compare the geographical location of the power source with fuel-location data stored in a database. The exhaust control system is configured to modify, activate, or deactivate at least one engine control system, or activate or deactivate at least one power source warning system, based on a result of comparing the geographical location of the power source with the fuel-location data.

18 Claims, 2 Drawing Sheets

EXHAUST CONTROL SYSTEM IMPLEMENTING FUEL QUALITY DETECTION

TECHNICAL FIELD

This disclosure pertains generally to a control system for a power source, and more particularly, to an exhaust control system for a power source implementing fuel quality detection based on geographical location.

BACKGROUND

Internal combustion engines, including diesel engines, gasoline engines, gaseous fuel-powered engines, and the like, may exhaust a complex mixture of air pollutants including, for example, gaseous compounds and solid particulate matter. These air pollutants, which sometimes originate as components or natural impurities in fuel, can affect exhaust emissions, damage emission control devices, and increase secondary pollutant formation in the atmosphere.

Sulfur is a naturally occurring element in all crude oils. Heavy fuels derived from crude oil typically have higher sulfur content. Diesel fuels, for example, often contain sulfur and other substances that, at times, convert to potentially corrosive and environmentally unfriendly by-products. During combustion, sulfur is oxidized to sulfur dioxide ($SO_2$) and minute amounts of sulfur trioxide ($SO_3$). The resulting $SO_3$ reacts with water vapor to form sulfuric acid. Once the exhaust gas cools, the resulting $SO_2$ likewise reacts with water condensate to form sulfuric acid. The sulfuric acid subsequently condenses downstream in the exhaust system to produce an acidic condensate.

Acidic condensates are a major cause of engine component corrosion, secondary wear from corrosion by-products, and engine oil acidification. Additionally, high sulfur fuel and its resulting acidic condensate can affect the performance and durability of combustion engine systems and their components, such as for example, Clean Gas Induction (CGI) systems, Exhaust Gas Recirculation (EGR) systems, after-cooler systems (e.g., Air-to-Air After Cooling (ATAAC), and the like), turbocharger compressors, sensors, catalyst, and the like.

Consequently, there has been a consistent demand for lower-sulfur content in diesel fuels. Despite efforts to reduce sulfur content in fuels, however, exhaust system component corrosion, due to acidic sulfur by-products, continues to be a problem. This is particularly so in geographical regions where low sulfur fuel is unavailable. Moreover, even after fuels with very low sulfur content become routinely available, there may still be problems associated with poor fuel quality, batch-to-batch variation in fuel sulfur content, improper fuel selection, misfueling, and the like. At present, there are no reliable onboard methods for monitoring the sulfur levels of fuel utilized in a power source.

Accordingly, there is a need for improved methods for monitoring and detecting the quality of fuel utilized in a power source. There is also a need for improved systems and methods of controlling exhaust system, to mitigate damage from the components or natural impurities in fuel, which implement fuel quality detection.

A method for adaptively controlling automotive control systems, based on the automobile's geographic position, is described in U.S. Patent Application No. 2003/0182026 ("Faisal et al."). Faisal et al. describes methods and systems for controlling the emission control systems based on the vehicle's geographic location. These methods, however, are limited to fine-tuning emission control systems or adjusting the emission control systems to comply with the emission requirements of the particular area. The methods disclosed in Faisal et al. do not provide for, for example, a system, method or apparatus that detects the quality of the fuel or that determines the mileage exposure of a power source to sulfur-containing fuels. Accordingly, there is a need for systems, apparatuses, and methods that implement fuel quality detection.

The present disclosure is directed to overcoming one or more of the problems set forth above.

SUMMARY OF THE INVENTION

In one aspect, the present disclosure is directed to an exhaust control system for a power source. The control system includes a navigation tool and a processor. The navigation tool may be capable of detecting a geographical location of a power source. The processor may be capable of comparing the geographical location of the power source with fuel-location data stored in a database that may be capable of storing fuel-location data. The exhaust control system may be capable of modifying, activating, or deactivating at least one engine control system, or activating or deactivating at least one power source warning system, based on a result of comparing the geographical location of the power source with the fuel location data.

In another aspect, the present disclosure is directed to a method for controlling a system for a power source based on geographical location of the power source. The method includes determining a geographical location of a power source and comparing the geographical location of a power source with stored fuel-location data to determine whether or not the power source is in a geographical location where the stored fuel-location data satisfies a predetermined condition. The method further includes modifying, activating, or deactivating at least one power source system, or activating or deactivating at least one power source warning system, based on the result of the comparison between the geographical location of the power source and the stored fuel-location data.

In another aspect, the present disclosure is directed to a work machine. The work machine includes a power source and a power source control system. The power source control system includes a system for determining a geographical location of a power source and a processor. The processor may be configured to compare the geographical location of the power source with fuel-location data stored in a database. The power source control system may be configured to modify, activate, or deactivate at least one engine control system, or activate or deactivate at least one power source warning system, based on a result of comparing the geographical location of the power source with the fuel-location data.

DETAILED DESCRIPTION

Due to regional variation in fuel quality across the world, it is contemplated that the presence of components or impurities in the fuel, or the exhaust, of a power source can be determined based on the geographical location of the power source. For example, the sulfur content of diesel fuel can be established by determining whether or not a power source is operating in a geographical location where high sulfur fuel is available, used, or sold.

Figure 1:
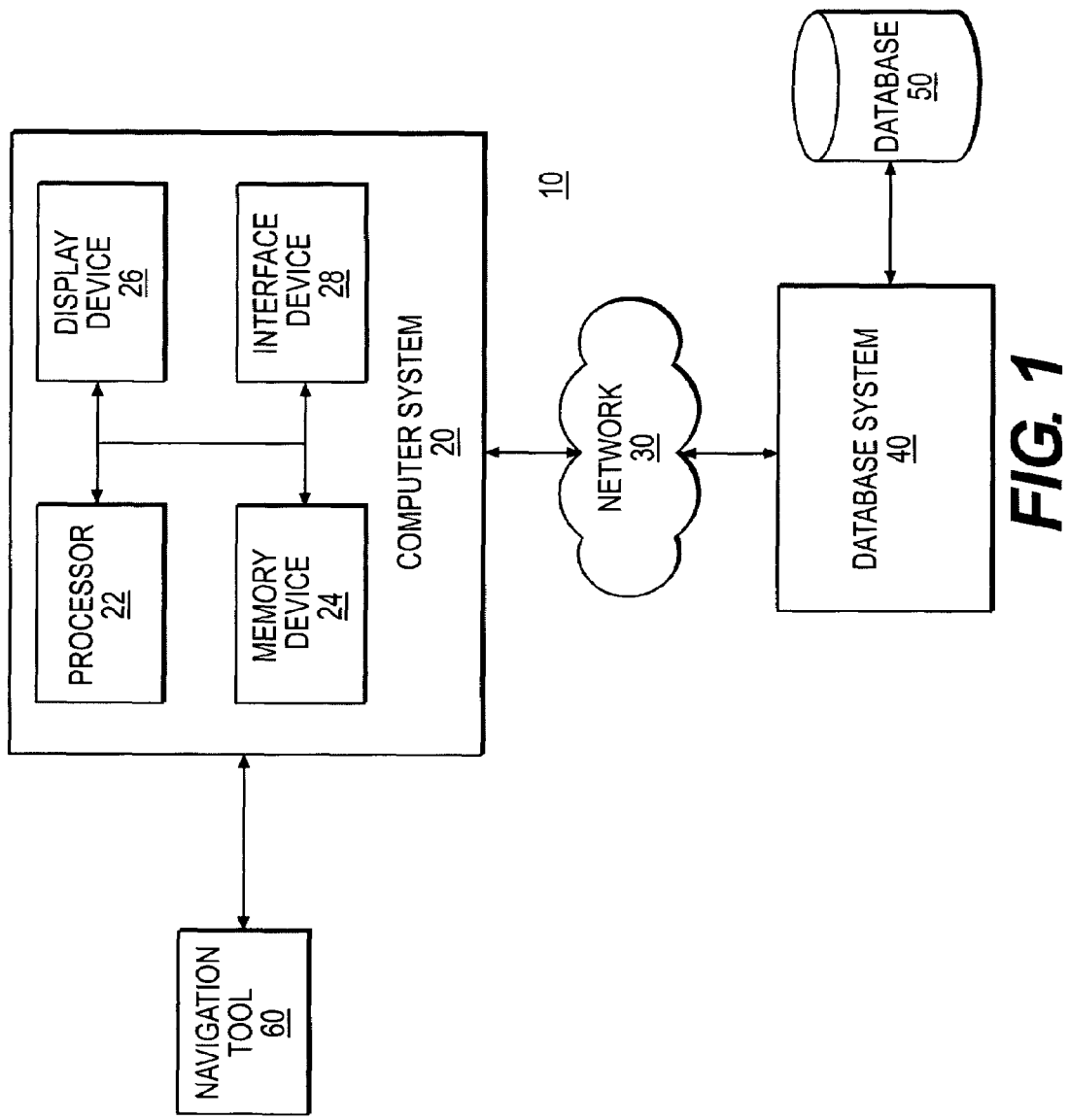
FIG. 1 is a diagrammatic illustration of a control system for a power source according to an exemplary disclosed embodiment.

FIG. 1 illustrates an exemplary control system 10 for a power source. The control system 10 may include a computer system 20. Computer system 20 may include, for example, a processor 22, a memory device 24, a display device 26, and an interface device 28. Processor 22 may include one or more processor devices, such as a microprocessor, that execute program instructions to perform various functions. In an exemplary embodiment, control system 10 can be configured to modify, activate, or deactivate at least one power source control system, or activate or deactivate at least one power source warning system consistent with certain disclosed exemplary embodiments.

Control system 10 can further include a navigation tool 60. The navigation tool 60 can be configured to determine the geographical location of a power source. For example, when control system 10 is associated with a power source, the navigation tool 60 can be configured to determine a geographical location of the power source and may be configured to provide location data. Examples of navigation tool 60 include GPS, EGNOS, Galileo, Euridis satellite navigation system, and the like, and their respective receivers. In an exemplary environment, control system 10 may represent a single computing system.

In an exemplary embodiment, a navigation tool 60 may be associated with a power source 110 and may be further configured to perform one or more functions. Navigation tool 60 may be configured to sense the geographical location of a power source and track its path across a map as it changes location. Navigation tool 60 may further be configured to stay in constant communication with, for example, GPS satellites to monitor the location of a power source.

In another exemplary embodiment, the geographical location of a power source may be supplied manually or electronically or wirelessly to a processor 22 associated with a power source. Navigation tool 60 may further monitor at least one other quantity (e.g., monitor the distance traveled by a power source, and the like) useful in establishing the degree of exposure of a power source to adverse regional conditions (e.g., high sulfur fuel, and the like). For example, by monitoring the distance traveled by a power source, it may be possible to estimate the amount of fuel consumed by the power source and, indirectly, the damage possibly sustained by the power source as a result of the adverse regional condition.

Memory device 24 may include one or more storage devices that maintain data (e.g., instructions, software applications, and the like) used by processor 22. For example, memory device 24 may include browser software that enables computer system 20 to retrieve content from external sources, such as a remote database system 40. Memory device 24 may also include software that performs, when executed by processor 22, comparison processes (e.g., comparing the geographical location of the power source with fuel-location data stored in a database, and the like) consistent with certain disclosed embodiments. Additionally, memory device 24 may include software that performs processes, when executed by processor 22, that collaborate with another computer system to perform search processes (e.g., finding regional information data, and the like) and comparison processes (e.g., comparing a geographical location of a power source to regional information data, and the like, associated with the determined geographical location), consistent with certain disclosed exemplary embodiments.

Display device 26 may include any known type of display device that presents information to the user or operator of computer system 20. Interface device 28 may include one or more known interface modules that facilitate the exchange of data between the internal components of computer system 20 and external components, such as database system 40. Further, interface device 28 may include a network interface device that allows a user system to receive and send data to and from network 30.

Network 30 may include any type of network that facilitates communications between remote components. For example, network 30 may include a local area network (LAN), a wide area network (WAN), a dedicated intranet, the Internet, and/or a wireless network. Network 30 may be implemented using wired or wireless communication mediums or a combination of both. Further, network 30 may represent a communication path that interfaces with components within a single computing environment, such as computer system 20 and database system 40. In an exemplary embodiment, control system 10 can include a wired communication link between control system 10 and computer data network 30. Alternatively, control system 10 can include a wireless communication link between the control system 10 and computer data network 30.

Database system 40 may represent one or more storage devices configured in any type of known storage system configuration that facilitates the locating, accessing, and retrieving of data stored in the storage devices, (e.g., Sybase, Oracle, MySQL, SQL, Access, and the like). Database 50 may include one or more storage devices that store information, such as a CD-ROM, a DVD, a floppy disk, a hard disk, a flash memory device, a magnetic card, a tape drive, an array of memory devices, and the like. Database 50 may include data structures that are configured in a searchable format. These data structures may have various degrees of accessibility. For example, in an exemplary embodiment, database 50 may include a simple text-based data file that holds data. Database system 40 may parse the data based on a text-based search string that includes terms that may be included in the data file. The data file may reside on hardware that may store other types of information, such as files that are not relevant to the regional fuel quality data. Further, any type of information may be stored in database 50, such as text files, graphical image-related data, audio data, and the like, that may or may not be used in processing search requests.

Alternatively, database 50 may include more complex data structures, such as a Relational Database Management System (RDBMS). The data tables may be built using specialized database software. Database system 40 may execute specialized database software to search database 50 based on search queries written in languages such as, for example, Structured Query Language (SQL).

Database 50 may be configured to store information associated with regional information data including regional fuel quality conditions, fuel-location data, regional emission standards, regional-base operating instructions, adverse regional conditions, and the like. Fuel-location data can include, for example, fuel component data (e.g., fuel sulfur content, the presence of components or impurities in the fuel, and the like), fuel availability, and the like. The stored regional information data can be in the form of, for example, at least one look-up table, a database, stored memory, and the like. The look-up table may be programmed with data by a user or operator, programmed remotely, or programmed in any other way known in the art. In an exemplary embodiment, the stored regional information can include a database of fuel-location data, for example, of information regarding the sulfur content of regionally available fuel. A sulfur content can be stored in, for example, one or more look-up tables that correlate specific geographical locations or regions with a corresponding sulfur content in the fuel, expressed in, for example, parts per million (ppm). The stored fuel sulfur content can be subsequently compared to a predetermined specification to determine whether or not further action is required by control system 10.

In an exemplary embodiment, regional information data can be employed by control system 10, for example, to determine whether or not a power source is operating in a region where high sulfur fuel is available, used, or sold. As previously noted, certain after-treatment technologies associated with a power source, including an air-to-air aftercoolers, and the like, can be subject to corrosion and secondary wear from corrosion by-products and acidic condensates, resulting from the use of high sulfur fuel. Accordingly, control system 10, including navigation tool 60, can be used to determine if a power source is operating in a geographical location where high sulfur fuel is available, used, or sold. If control system 10 establishes that a power source is operating in a geographical location where high sulfur fuel is available, used, or sold, then that data can be used to mitigate damage to components, for example, of an exhaust system for a power source.

For example, once the geographical location of the power source is determined by the navigation tool 60, or entered via interface device 28, and communicated to control system 10, that location data can be compared to stored regional information data (e.g., regional fuel quality conditions, fuel-location data, regional emission standards, regional-base operating instructions, and the like) to determine whether or not the power source is operating in a geographical location where a condition satisfies a predetermined specification. The predetermined specification may include, for example, exceeding a maximum allowable fuel sulfur content, or staying within a predetermined range of allowable fuel sulfur content, and the like.

In an exemplary embodiment, the predetermined specification can include that a fuel sulfur content of the fuel may not exceed a predetermined amount ranging from about 50 ppm to about 1500 ppm, and further from about 50 ppm to about 500 ppm. In another exemplary embodiment, the predetermined specification includes that a fuel sulfur content may not exceed 500 ppm, and further may not exceed 50 ppm.

In an exemplary embodiment, a predetermined specification can include a maximum sulfur content in the fuel. If, for example, the maximum fuel sulfur content associated with a particular location exceeds that of the predetermined specification, control system 10 can be configured to modify, activate, or deactivate at least one engine control system, or activate or deactivate at least one power source warning system, based on a result of comparing the geographical location of the power source with the fuel-location data. For example, control system 10 can be configured to modify the flow of an exhaust gas, so as to bypass, for example, an air cooler 126, or an exhaust cooler 144, thus, minimizing the exposure of such system to possible acidic condensates and corrosion by-products. In another exemplary embodiment, control system 10 can be configured to decrease or stop the supply of at least a portion of the exhaust flow to the air induction system, in response to the regional fuel sulfur content exceeding a predetermined amount. Decreasing or stopping the supply of at least a portion of the exhaust flow may take place by activating or deactivating one or more valves, and the like, associated with the exhaust flow of an exhaust recirculation system.

In another exemplary embodiment, modifying at least one engine control system can include actuating at least one valve associated with controlling the exhaust flow of an exhaust recirculation system.

In an exemplary embodiment, control system 10 can be configured to activate or deactivate at least one power source warning system, based on a result of comparing the geographical location of the power source with the fuel-location data. Examples of an action taken by power source warning system include activating or deactivating at least one warning, display, alarm, light, diagnostic code, operating instruction, warranty instruction, and the like. Examples of diagnostic codes include Diagnostic Trouble Codes (DTC), emissions related diagnostic trouble codes, or any other electronic data stored in an automotive computer, or elsewhere, indicating the presence of a fault detected by the control system. Other examples of warning system include display system capable of displaying an operating instruction, a warranty instruction, a warning, an alarm system, a malfunction indicator system, and the like.

If, for example, the result of a comparison between the geographical location of the power source and stored fuel-location data yields a fuel sulfur content value that exceeds that of a predetermined specification, control system 10 can be configured to display a warning to the operator via a display device 26. The display can further include one or more operating instructions to help the operator minimize the damage due to an adverse fuel condition, misfueling, and the like. The display can also include one or more warranty instructions.

In an exemplary embodiment, control system 10 can be configured to activate one or more diagnostic codes when the maximum fuel sulfur content associated with a particular location exceeds that of the predetermined specification. In another exemplary embodiment, control system 10 can be configured to activate one or more lights when a comparison between the geographical location of the power source and stored fuel-location data yields a fuel sulfur content value that exceeds that of a predetermined specification.

Figure 2:
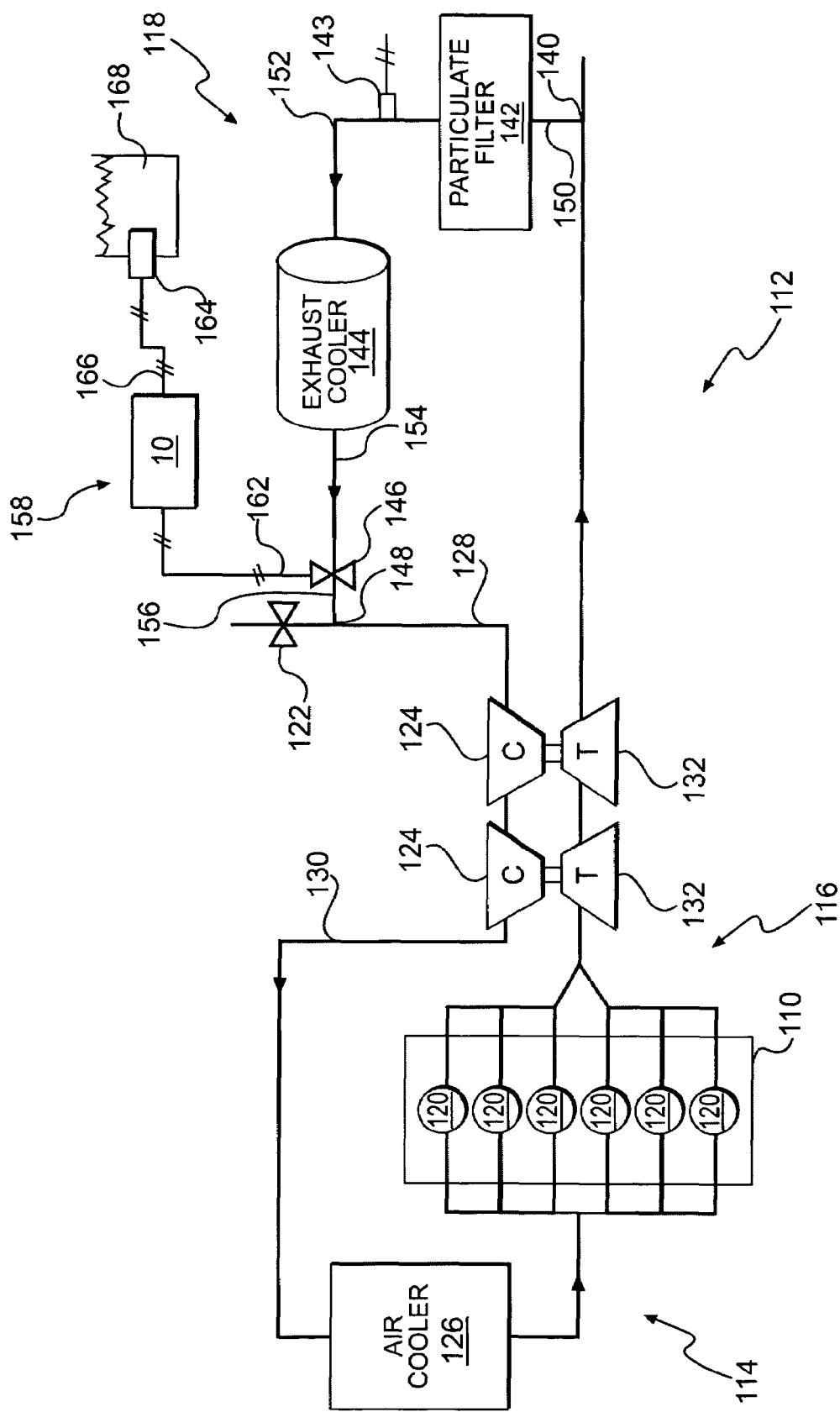
FIG. 2 is a diagrammatic illustration of an exhaust recirculation system employing a control system according to an exemplary disclosed embodiment.

FIG. 2 illustrates an exemplary exhaust recirculation system 112, including control system 10 for a work machine (not shown). Exhaust recirculation system 112 can include a power source 110 and an exhaust control system 158, including a control system 10. Power source 110 may include an engine such as, for example, a diesel engine, a gasoline engine, a gaseous fuel-powered engine, natural gas engine, and the like, or any other engine apparent to one skilled in the art. Power source 110 may, alternatively, include another source of power such as a furnace or another suitable source of power. Exhaust recirculation system 112 may include an air induction system 114, an exhaust system 116, and a CGI system 118.

Air induction system 114 can be configured for introducing charged air into one or more combustion chambers 120 of power source 110. For example, air induction system 114 may include an induction valve 122, one or more compressors 124, and an air cooler 126. It is contemplated that additional components can be included within air induction system 114 such as, for example, additional valving, one or more air cleaners, one or more waste gates, a control system, and other configurations for introducing charged air into combustion chambers 120.

An induction valve 122 can be fluidly connected to compressors 124 via a fluid passageway 128 and configured to regulate the flow of atmospheric air to power source 110. Induction valve 122 can be in communication with a control system 10 and selectively actuated in response to one or more predetermined conditions. In an exemplary embodiment, a comparison of the geographical location of the power source with the fuel-location data may yield a fuel sulfur content exceeding a maximum allowable fuel sulfur content or outside of a predetermined range of allowable fuel sulfur content. In such a case, control system 10 may be configured to proportionally increase the flow through induction valve 122 with respect to the flow of exhaust through a recirculation valve 146.

Compressors 124 can be configured to compress the air flowing into power source 110 to a predetermined pressure level. Compressors 124 can be disposed in a series relationship and fluidly connected to power source 110 via a fluid passageway 130. Each of compressors 124 may include a fixed geometry compressor, a variable geometry compressor, or any other type of compressor known in the art. It is contemplated that compressors 124 may alternatively be disposed in a parallel relationship or that air induction system 114 may include only a single compressor 124. It is further contemplated that compressors 124 can be omitted, when a non-pressurized air induction system is desired.

An air cooler 126 can be an air-to-air heat exchanger, or an air-to-liquid heat exchanger, and configured to facilitate the transfer of heat to or from the air directed into power source 110. For example, air cooler 126 may include a tube and shell type heat exchanger, a plate type heat exchanger, or any other type of heat exchanger known in the art. Air cooler 126 can be connected to power source 110 via fluid passageway 130.

An exhaust system 116 may include the capability for directing exhaust flow out of power source 110. For example, exhaust system 116 may include one or more turbines 132 connected in a series relationship. It is contemplated that exhaust system 116 may include additional components such as, for example, emission controlling devices (e.g., particulate traps, NOx absorbers, other catalytic devices, and the like), attenuation devices, or other measures for directing exhaust flow out of power source 110, that are known in the art.

Each turbine 132 can be connected to one compressor 124 and configured to drive the connected compressor 124. In particular, as the hot exhaust gases exiting power source 110 expand against blades (not shown) of turbine 132, turbine 132 may rotate and drive the connected compressor 124. It is contemplated that turbines 132 may alternatively be disposed in a parallel relationship or that only a single turbine 132 can be included within exhaust system 16. It is also contemplated that turbines 132 can be omitted and compressors 124 driven by power source 110 mechanically, hydraulically, electrically, or in any other manner known in the art, if desired.

A clean gas induction (CGI) system 118 can be configured for redirecting a portion of the exhaust flow of power source 110 from exhaust system 116 into air induction system 114. For example, CGI system 118 may include an inlet port 140, a recirculation particulate filter 142, a mass flow sensor 143, an exhaust cooler 144, a recirculation valve 146, and a discharge port 148. It is contemplated that CGI system 118 may include additional or different components such as a catalyst, an electrostatic precipitation device, a shield gas system, any other ways of redirecting, and the like, that are known in the art.

Inlet port 140 can be connected to exhaust system 116 and configured to receive at least a portion of the exhaust flow from power source 110. Specifically, inlet port 140 can be disposed downstream of turbines 132 to receive exhaust gases from turbines 132. It is contemplated that inlet port 140 may alternatively be located upstream of turbines 132.

A recirculation particulate filter 142 can be connected to inlet port 140 via a fluid passageway 150 and configured to remove particulates from the portion of the exhaust flow directed through inlet port 140. Recirculation particulate filter 142 may include electrically conductive or non-conductive coarse mesh elements. It is contemplated that recirculation particulate filter 142 may include a catalyst for reducing an ignition temperature of the particulate matter trapped by recirculation particulate filter 142, a system for regenerating the particulate matter trapped by recirculation particulate filter 142, or both a catalyst and a capability for regenerating. The capability for regenerating may include, among other things, a fuel-powered burner, an electrically-resistive heater, an engine control strategy, or any other measure for regenerating known in the art. It is contemplated that recirculation particulate filter 142 can be omitted, if desired.

A mass flow sensor 143 can be configured to measure exhaust flow passing through a fluid passageway 152. Examples of mass flow sensor 143 include a thermal mass flow meter, a laminar flow element, a mass compensated positive displacement roots meter, or any other suitable device configured to measure gaseous flows.

An exhaust cooler 144 can be fluidly connected to recirculation particulate filter 142 via fluid passageway 152 and configured to cool the portion of the exhaust flowing through inlet port 140. Exhaust cooler 144 may include a liquid-to-air heat exchanger, an air-to-air heat exchanger, or any other type of heat exchanger known in the art for cooling an exhaust flow. It is contemplated that exhaust cooler 144 can be omitted, if desired.

A recirculation valve 146 can be fluidly connected to exhaust cooler 144 via a fluid passageway 54 and configured to regulate the flow of exhaust through CGI system 118.

Examples of recirculation valve 146 and induction valve 122 include a spool valve, a shutter valve, a butterfly valve, a check valve, a diaphragm valve, a gate valve, a shuttle valve, a ball valve, a globe valve, or any other valve known in the art. Recirculation valve 146 and induction valve 122 can be solenoid-actuated, hydraulically-actuated, pneumatically-actuated, or actuated in any other manner.

A flow characteristic of recirculation valve 146 can be related to a flow characteristic of induction valve 122. Specifically, recirculation valve 146 and induction valve 122 may both be controlled such that an amount of exhaust flow entering air induction system 114 via recirculation valve 146 can be related to an amount of air flow entering air induction system 114 via induction port 122. For example, as the flow of exhaust through recirculation valve 146 increases, the flow of air through induction valve 122 may proportionally decrease. Likewise, as the flow of exhaust through recirculation valve 146 decreases, the flow of air through induction valve 122 may proportionally increase. In an exemplary embodiment, the flow of air through recirculation valve 146 can be proportionally decreased or stopped, with respect to the flow of exhaust through an induction valve 122, in response to, for example, a result of comparing the geographical location of the power source with the fuel-location data that yields a fuel sulfur content exceeding a maximum allowable fuel sulfur content or is outside of a predetermined range of allowable fuel sulfur content.

A discharge port 148 can be fluidly connected to recirculation valve 146 via a fluid passageway 156 and configured to direct the exhaust flow regulated by recirculation valve 146 into air induction system 114. Specifically, discharge port 148 can be connected to air induction system 114 upstream of compressors 124, such that compressors 124 may draw the exhaust flow from discharge port 148.

Exhaust recirculation system 112 may further include a control system 158. Control system 158 may include a control system 10 in communication with recirculation valve 146 to selectively actuate recirculation valve 146 in response to one or more predetermined conditions. Specifically, control system 10 can be in communication with recirculation valve 146 by way of a communication line 162. A control system 10 can also be communication with a sensor 164 via a communication line 166.

In an exemplary embodiment, control system 10 can be configured to decrease or stop the supply of the at least a portion of the exhaust flow to the air induction system 114 if, for example, the regional fuel sulfur content exceeds a predetermined amount. In an exemplary embodiment, a comparison of the geographical location of the power source with the fuel-location data may yield a fuel sulfur content exceeding a maximum allowable fuel sulfur content or outside of a predetermined range of allowable fuel sulfur content. In such a case, control system 10 may be configured to decrease or stop a flow of exhaust through recirculation valve 146, and proportionally increase the flow of air through induction valve 122.

In an exemplary embodiment, sensor 164 can include a sensing element exposed to a fuel supply 168, of power source 110, and configured to monitor of at least one of the quantity selected from volume of fuel in a tank associated with the power source 110, volume of fuel consumed, and volume of fuel loaded during refueling.

It should be appreciated that control system 10 may embody a single microprocessor or multiple microprocessors that can be capable of modifying the amount of exhaust directed from CGI system 118 back into air induction system 114. For example, control system 10 may include a memory, a secondary storage device, and a processor 22, such as a central processing unit, or any other measure for modifying the flow of recirculation gas known in the art. Numerous commercially available microprocessors can be configured to perform the functions of control system 10.

Additionally, control system 10 could readily embody a general power source microprocessor that can be capable of controlling numerous power source functions. Various other known circuits can be associated with control system 10, including power supply circuitry, signal-conditioning circuitry, solenoid driver circuitry, communication circuitry, and other appropriate circuitry. For example, although some of the disclosed exemplary embodiments are described as being associated with data stored in memory and other storage mediums, one skilled in the art will appreciate that these embodiments may also be stored or read from other types of computer-readable media, such as secondary storage devices, like hard disks, floppy disks, optical storage devices, DVDs, etc.

An exemplary embodiment includes a method for controlling a system for a power source 10 based on geographical location of the power source 10. The method includes the step of determining a geographical location of a power source 10. The established geographical location of a power source 10 can then be compared with stored fuel-location data to determine whether or not the power source 10 is in a geographical location where the stored fuel-location data satisfies a predetermined condition. The method further includes modifying, activating, or deactivating at least one power source system, or activating or deactivating at least one power source warning system, based on the result of the comparison between the geographical location of the power source and stored fuel-location data.

In an exemplary embodiment, a predetermined condition is a sulfur content that exceeds a predetermined amount. In an exemplary embodiment, the at least one power source system includes an exhaust gas recirculation system configured to supply at least a portion of an exhaust flow from the exhaust system to the air induction system. In another exemplary embodiment, the method includes decreasing or stopping the supply of the at least a portion of the exhaust flow to the air induction system, in response to the regional fuel sulfur content exceeding a predetermined amount. In yet another exemplary embodiment, the method of activating or deactivating at least one power source warning system includes a display, an alarm, a light, or at least one diagnostic code.

INDUSTRIAL APPLICABILITY

The disclosed control systems for a power source, and methods for monitoring a location of a power source to identify fuel quality conditions can be applicable to a wide variety of engines. Acidic condensates are a major cause of exhaust system corrosion. For example, high sulfur fuels may affect the performance and durability of combustion engine systems and components. The disclosed novel control systems and methods may help minimize the exposure of a power source to fuels having adverse components (e.g., sulfur, and the like) that reduce performance, damage engine components, and affect combustion engine systems.

The disclosed control systems and methods utilize a novel approach that employs determining the geographical location of a power source to determine if it is being operated in an area known to have high sulfur fuels. If it is determined that the power source is operating in a region with high sulfur fuel, the disclosed control systems and methods can take certain actions to reduce or prevent adverse effects on the power source's systems and components.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only. Accordingly, the disclosed embodiments are not limited to the described examples, but instead are defined by the appended claims in light of their full scope of equivalents.

What is claimed is:

1. An exhaust control system for a power source, comprising:

a navigation tool for detecting a geographical location of a power source; and a processor for comparing the geographical location of the power source with fuel-location data stored in a database capable of storing fuel-location data, wherein the fuel-location data includes regional fuel sulfur content data;

wherein the exhaust control system is configured to modify, activate, or deactivate at least one engine control system, or activate or deactivate at least one power source warning system, based on a result of comparing the geographical location of the power source with the fuel-location data.

2. The exhaust control system according to claim 1, wherein the navigation tool includes a Global Positioning System (GPS) receiver.

3. The exhaust control system according to claim 1, wherein the result of comparing the geographical location of the power source with the fuel-location data fuel includes determining whether or not a regional sulfur content exceeds a predetermined amount.

4. The exhaust control system according to claim 3, wherein the predetermined amount ranges from about 50 ppm to about 1500 ppm.

5. The exhaust control system according to claim 3, further comprising:
an exhaust system;
an air induction system; and
a clean gas induction (CGI) system configured to supply at least a portion of an exhaust flow from the exhaust system to the air induction system.

6. The exhaust control system according to claim 5, wherein the exhaust control system is configured to decrease or stop the supply of the at least a portion of the exhaust flow to the air induction system in response to the regional fuel sulfur content exceeding a predetermined amount.

7. A method for controlling a system for a power source based on geographical location of the power source, comprising:
determining a geographical location of the power source;
comparing the geographical location of the power source with stored fuel-location data to determine whether or not the power source is in a geographical location where the stored fuel-location data satisfies a predetermined condition, wherein the predetermined condition corresponds to a sulfur content of fuel; and
modifying, activating, or deactivating at least one power source system, or
activating or deactivating at least one power source warning system, based on the result of the comparison between the geographical location of the power source and stored fuel-location data.

8. The method according to claim 7, wherein the predetermined condition is a sulfur content greater than 500 ppm.

9. The method according to claim 7, wherein the predetermined condition is a sulfur content greater than 50 ppm.

10. The method according to claim 7, wherein the at least one power source system includes a clean gas induction (CGI) system configured to supply at least a portion of an exhaust flow from the exhaust system to the air induction system.

11. The method according to claim 10, including decreasing or stopping the supply of the at least a portion of the exhaust flow to the air induction system in response to the sulfur content exceeding a predetermined amount.

12. The method according to claim 7, wherein the at least one power source warning system includes a display, an alarm, a light, or at least one diagnostic code.

13. A work machine comprising:
a power source; and
a power source control system, comprising:
a system for monitoring a geographical location of the power source;
a processor configured to compare the geographical location of the power source with fuel-location data stored in a database, wherein the fuel-location data comprises regional fuel sulfur content data; including
wherein the power source control system is configured to modify, activate, or deactivate at least one engine control system, or activate or deactivate at least one power source warning system, based on a result of comparing the geographical location of the power source with the fuel-location data.

14. The work machine according to claim 13, wherein at least one engine control system includes a clean gas induction (CGI) system.

15. The work machine according to claim 13, further comprising a sensor capable of providing at least one of the following quantities: volume of fuel in a tank associated with the power source, volume of fuel consumed; volume of fuel loaded during refueling; and distance traveled by the work machine.

16. The work machine according to claim 13, further comprising a display capable of displaying at least one of the following based on a result of comparing the geographical location of the power source with the fuel-location data:
at least one alarm;
at least one warning;
at least one diagnostic code;
at least one operating instruction;
at least one warranty instruction;
warranty information; and
regional fuel quality data.

17. The work machine according to claim 13, further comprising an interface device for manually inputting a geographical location of a power source.

18. The work machine according to claim 13, wherein the result of comparing the geographical location of the power source with the fuel-location data fuel includes determining whether or not a regional sulfur content exceeds a predetermined amount.

* * * * *